United States Patent Office 3,248,391
Patented Apr. 26, 1966

3,248,391
3-ETHYLENEDIOXY-6-ALKYLPREGN-5-EN-17-HYDROXY-20-ONE AND DERIVATIVES THEREOF
Bjarte Löken, 44 Edgewood Road, Shrewsbury, Mass., and Irving V. Sollins, 87 Brevoort Lane, Rye, N.Y.
No Drawing. Filed Nov. 29, 1963, Ser. No. 327,072
5 Claims. (Cl. 260—239.55)

The present invention relates to 3-ethylene dioxy-6-alkylpregn-5-en-7-hydroxy-20-one, the 17 acyloxy and the 21-fluoro derivatives thereof. These compounds possess progestational, antiandrogenic and antiestrogenic activity. They are highly potent orally active hormonal agents. In many respects these compounds surpass, in activity, the known orally active compounds having the same 6 and 17-substituents but characterized by a Δ$^{4,3}$-ketone structure.

More generally, the compounds of the present invention can be represented by the following structural formula:

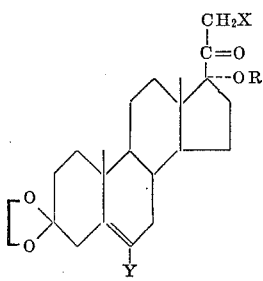

wherein X is H or F; Y is methyl, ethyl or propyl, and wherein R is H or a lower acyl group. The hydrocarbon chain of the 8 or less carbon acyl group (R) can be straight chain or branched alkyl radicals such as methyl, ethyl, propyl, isopropyl, n-butyl, isobutyl, tertiary butyl, n-pentyl, neopentyl, etc. The hydrocarbon chain may also be a cycloaliphatic radical such as cyclopentyl, cyclohexyl, cyclopentyl methyl, cyclohexyl methyl and the like.

The cyclic ketal at the 3-position is ethylene dioxy, 1,2, propylene dioxy 1, 2, or 2, 3 butylene dioxy.

The high oral activity of the present compounds appears to be intimately related to the 3-ketal Δ$^{5,6}$-alkyl structure. Comparative tests on the corresponding compounds not having a 6-alkyl group showed an absence of the high activity. On the other hand, comparative tests made with the unketalized precursor derivatives, i.e. the 3 keto Δ$^4$ steroids, showed the present compounds to be more active orally than the precursors.

The compounds of the present invention can be prepared from the corresponding Δ$^{4,3}$-keto-6-alkyl steroids by known ketalization techniques such as is described in:

(1) Antonucci et al., J. Organic Chem., 17, 1369 (1952)
(2) Dauben et al., J. Am. Chem. Soc., 76, 1359 (1954)

The present invention is further described in the examples which follow, which examples are to be considered illustrative only and not as limiting the invention in spirit or scope.

Example I

To a solution of 5 parts of 17α-acetoxy 6 α-methylprogesterone in 150 parts of benzene and 15 parts of ethylene glycol was added 0.2 part of p-toluenesulfonic acid monohydrate, and the mixture refluxed overnight. The reflux condenser was equipped with a Dean Stark water separator for removal of the water which formed during the ketalization reaction. The reaction mixture was cooled, washed with 50 parts of N/2 aqueous sodium carbonate solution (twice), dried over anhydrous sodium sulfate, and the solvent (benzene) was removed by evaporation under reduced pressure. To the crystalline residue was added 15–20 parts of ether, and the slurry filtered. There remained 4.0 parts of 17α-acetoxy-3-ethylenedioxy-6-methylpregn-5-en-20-one, which after recrystallization melted at about 187–189° C. and had a specific optical rotation of about −48.5° in chloroform solution (1 g./100 ml.). The infrared spectrum shows maxima at 3.40, 5.77, 5.86, 7.92, 8.00, 9.10, 9.30, 9.83 and 10.33 microns. Test studies indicate that this compound may have a higher antiestrogen activity than 6α-methyl 17-acetoxy progesterone. It also exhibits high progestational activity and a high antiandrogen activity.

Example II.—17α-hydroxy 3-ethylene dioxy-6-methylpregn-5-en-20-one

To a solution of 10 parts of 17α-hydroxy-6α-methylprogesterone in 300 parts of 2-methyl-2-ethyl-1,3-dioxolane was added 0.12 part of p-toluenesulfonic acid monohydrate, and the mixture heated in a flask equipped with a packed column having a total reflux partial take-off head corresponding to approximately 40 theoretical plates under total reflux. The mixture was heated to boiling and the reflux ratio maintained at about 1:60 for a period of 24 hours. Initially the temperature at the top of the column was 79° C. corresponding to the boiling point of butanone, formed by the exchange reaction (and which is continuously removed). At the end of the reaction period the boiling point temperature at the top of the column was 116° C., indicating that the distillate was essentially 2-methyl-2-ethyl-1.3-dioxolane and that the reaction was completed.

The solution was cooled, transferred to a separatory funnel and washed twice with 100 parts each of 2 N, sodium carbonate solution. The methyl ethyl dioxolane layer was dried over anhydrous sodium sulfate and the solvent removed by evaporation under reduced pressure. The residue was dissolved in 250 parts of methanol containing traces (0.01 part) of diethylamine. Filtration through celite, followed by concentration under reduced pressure to a final volume of about 60 parts, cooling and filtration, gave 8.3 parts of crystals; further concentration of the mother liquors gave an additional one part of material with slightly lower melting point, totaling 9.3 parts. An additional crystallization from methanol provided the analytical sample M.P. about 214–216° C. The specific optical rotation was −70.4° measured in chloroform (ca. 1 g./100 ml. concentration).

The 17α-hydroxy-3-ethelene dioxy-6-methylpregn-5-en-20-one showed a high antiestrogen and antiandrogen activity comparable to the product of Example I, with a lesser progestational activity.

Example III 10 parts of 17α-acetoxy-6α-methylprogesterone were ketalized in 2-methyl-2-ethyl-1,3-dioxolane according to the method described in Example II. The recrystallization in methanol produced as crude product, 9.1 parts of 17α - acetoxy - 3-ethylenedioxy-6-methylpregn-5-en-20-one with a melting point about 185° C.

Example IV 10 parts of 21-fluoro-17α-acetoxy-6α-methyl progesterone (obtained as described by C. Bergstrom, P. B. Soleman, R. Nicholson, R. M. Dodson: J. Am. Chem. Soc. 82, 2322 (1960)) were ketalized in 2-methyl-2-ethyl-1,3-dioxolane solution according to the method described in Example II. Addition of trace base (diethyl amine) to the methanol solvent used for crystallization was omitted. 8.9 parts of 17α-acetoxy-3-ethylenedioxy-21-fluoro-6-methylpregn-5-en-20-one were obtained. Recrystallization from ether (a Soxhlet extractor was used) gave the analytical sample, which had a specific optical rotation of about −60° in chloroform solution (1 g./100 ml.).

The infrared spectrum had its salient maxima at 3.40, 5.79, 5.81, 7.95, 8.00, 9.32, 9.84 and 10.32 microns.

*Example V*

10 parts of 17α-hydroxy-21-fluoro-6α-methyl progesterone (obtained by the method of Bergstrom et al., loc. cit.) were ketalized in 2-methyl-2-ethyl-1,3-dioxolane solution according to the method described in Example II. Addition of trace base was omitted during the workup, and potassium bicarbonate solution (5% aqueous) was used during the washing procedure. 8.5 parts of 17α-hydroxy-3-ethylenedioxy-21-fluoro-6-methylpregn-5-en - 20 - one were obtained, which had a specific optical rotation of about —81° in chloroform solution and showed the following bands in the infrared region: 2.78, 3.40, 5.87, 9.10, 9.90, 10.65 microns.

*Example VI*

From 17α-hydroxy-6α-methyl progesterone the cyclopentylpropionate ester was prepared according to a method described by F. C. Babcock et al., J. Am. Chem. Soc. 80, 2904 (1958). 10 parts of this material treated exactly according to Example V gave 7.5 parts of oily crystals which were recrystallized from ether in a Soxhlet extractor to give 5.2 parts of 17α-cyclopentyl propionoxy-3-ethylenedioxy-6-methylpregn-5-en-20-one which had an optical rotation of about —50° in chloroform solution.

*Example VII*

10 parts of 17α-hexanoyloxy-6α-methylprogesterone prepared according to the above noted Babcock et al. technique were treated according to Example I. The residue, however, failed to give a crystalline material. Therefore it was chromatographed on 250 parts silica gel (Davison 60–200) in benzene and eluted with benzene ethyl acetate mixtures, each fraction with increasing concentration of ethyl acetate. The fraction containing 10% ethyl acetate gave upon evaporation and crystallization of the semicrystalline residue (ether solution) 5 parts of 17α-hexanoyloxy-3-ethylenedioxy-6-methylpregn - 5 - en-20-one. The melting point of this substance was about 93–99°. As a proof of identity of this substance, 3 parts were dissolved in 60 parts of methanol and heated to reflux. Over a period of ½ hour a solution of potassium hydroxide (0.35 part) in water (12 parts) was added in small portions at two-minute intervals. The refluxing conditions were maintained during the addition and after completion of the addition for one hour. The reaction mixture was condensed under reduced pressure to about half the original volume. The crystallization which had started was completed by reposing the mixture in a freezer over night. The following morning the crystals were filtered, washed with a little methanol/water (4:1), then with distilled water, dried and recrystallized from ether. 1.9 parts of 17α-hydroxy-3-ethylenedioxy-6-methylpregn-5-en-20-one were obtained, showing a melting point of about 213–217° and a specific optical rotation of —69° in chloroform solution. The most salient bands in the infrared spectrum were: 2.79, 3.40, 5.92, 7.04, 9.10, 9.90, 10.25, 10.65 microns. This material was found identical with the compound obtained in Example II by mix melting point determination. Hydrolysis of the acyloxy substituent at C–17 is a convenient way of preparing the 17-hydroxy-3-ethylene ketals when the ester (preferably the 17-acetate or propionate) is available. However, when the 21-fluoro substituent is present, the so-called Favorski rearrangement is known to occur, and this alkaline hydrolysis technique should be avoided.

*Example VIII*

10 parts of 6α-methyl-17α-hexanoyloxy-21-fluoroprogesterone were ketalized as described in Example V. There was obtained 6.5 parts of 17α-hexanoyloxy-21-fluoro-3-ethylenedioxy-6-methylpregn-5-en-20 - one, showing an optical rotation of about —70° in chloroform. Salient infrared bands were: 3.40, 5.78, 8.50, 9.10, 9.32, 9.88, 10.37 microns.

What is claimed is:

1. A compound of the structural formula

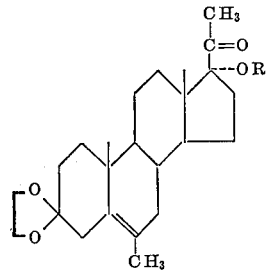

where R is a member of the group consisting of H and lower acyl; and the cyclic ketal is ethylene dioxy.

2. 17α-acetoxy-3-ethylenedioxy-6-methylpregn - 5 - en-20-one.

3. 17α-hydroxy-3-ethylenedioxy-6-methylpregn - 5 - en-20-one.

4. 17α - cyclopentylpropionoxy - 3 - ethylenedioxy - 6-methylpregn-5-en-20-one.

5. 17α-hexanoyloxy-3-ethylenedioxy - 6 - methylpregn-5-en-20-one.

References Cited by the Examiner

UNITED STATES PATENTS 2,932,638   4/1960   Gould et al. _____ 260—239.55

OTHER REFERENCES

Loewenthal: Tetrahedran, vol. 6, No. 4, pp. 269–303, pp. 287–295 relied on, June 1959.

LEWIS GOTTS, *Primary Examiner.*